(12) United States Patent
Asano

(10) Patent No.: US 7,869,703 B2
(45) Date of Patent: Jan. 11, 2011

(54) OPTICAL APPARATUS

(75) Inventor: Takurou Asano, Kawachi-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 12/493,803

(22) Filed: Jun. 29, 2009

(65) Prior Publication Data

US 2009/0324208 A1    Dec. 31, 2009

(30) Foreign Application Priority Data

Jun. 30, 2008   (JP) ............................. 2008-171424

(51) Int. Cl.
   *G03B 17/00*   (2006.01)
   *H04N 17/00*   (2006.01)
   *H04N 5/228*   (2006.01)
(52) U.S. Cl. ........................ 396/55; 348/187; 348/208.8
(58) Field of Classification Search .................. 396/55; 348/187, 180, 208.8, 208.7; 356/615
   See application file for complete search history.

(56) References Cited

U.S. PATENT DOCUMENTS 6,122,448 A * 9/2000 Shiomi ......................... 396/55

2007/0183764 A1* 8/2007 Imura et al. .................... 396/55
2008/0165273 A1* 7/2008 Toguchi ....................... 348/349

FOREIGN PATENT DOCUMENTS

| EP | 0582843 A1 | 2/1994 |
| JP | 06-043518 A | 2/1994 |
| JP | 2007-101671 A | 4/2007 |

* cited by examiner

*Primary Examiner*—W. B. Perkey
*Assistant Examiner*—Noam Reisner
(74) *Attorney, Agent, or Firm*—Canon U.S.A., Inc. I.P. Division

(57) ABSTRACT

An optical apparatus includes an image shake correction optical element driven in a movable range including an optical origin position, a detector detecting a position of the optical element, a locking mechanism limiting movement of the optical element within a lock range including the optical origin position and is narrower than the movable range. The apparatus further includes a memory storing a first distance between a first reference position in the movable range and the optical origin position and a second distance between a second reference position in the lock range and the optical origin position. A controller controls a position of the optical element based on a control origin position, and performs correction of at least one of the first distance, the second distance and the control origin position.

7 Claims, 13 Drawing Sheets

OPTICAL APPARATUS

BACKGROUND OF THE INVENTION

1. Field of the Invention

The present invention relates to an optical apparatus such as an interchangeable lens and an image pickup apparatus (camera), and particularly relates to an optical apparatus provided with an optical image shake correction function.

2. Description of the Related Art

Interchangeable lenses and image pickup apparatuses are often provided with an optical image shake correction function in which an image shake correction optical element such as a shift lens and a variable angle prism is driven to reduce image shake caused due to hand jiggling or the like. A high image shake correction effect of the optical image shake correction function is achieved by using a position detector that can detect a position of the image shake correction optical element with high accuracy.

As such a position detector, a relative position detector such as a pulse encoder having high position detection accuracy is widely used. However, the position detection by using the relative position detector requires accurate setting of an origin position which is a reference position for the position detection. In the optical image shake correction, a position is selected as the origin position which corresponds to an optical origin position allowing a light ray proceeding on an optical axis of an image pickup optical system to straightly progress without being refracted.

Methods for setting the origin position include one using an absolute position detector separate from the relative position detector. However, the use of the absolute position detector is not preferable in view of miniaturization and cost-lowering of the optical apparatus. Therefore, the following method has been proposed which sets the origin position by using only the relative position detector.

Japanese Patent Laid-Open No. 6-43518 discloses a method for setting the origin position which causes an image shake correction optical element to bring into contact with a mechanical end of a movable range (hereinafter referred to as "movable range end") of the image shake correction optical element and detects the origin position by using a distance measured in advance from the movable range end to the origin position. Further, Japanese Patent Laid-Open No. 2007-101671 discloses another method for setting the origin position which detects movable range ends of an image shake correction optical element on its both sides and sets a center of the movable range ends as the origin position.

The optical apparatuses provided with the optical image shake correction function generally include a lock mechanism which mechanically locks movement of the image shake correction optical element in order to limit the movement thereof within a lock range near the origin position when the optical image shake correction function is not used.

However, an end face of the lock mechanism forming an end of the lock range may be abraded due to multiple switching between a locked state and a lock-released state (unlocked state). Such abrasion makes it impossible to accurately set the origin position merely by detecting the mechanical movable range end in the lock mechanism using the method disclosed in the Japanese Patent Laid-Open Nos. 6-43518 and 2007-101671. Inaccurate setting of the origin position makes it impossible to control the position of the image shake correction optical element to the origin position in the locked state, which may cause displacement of the image shake correction optical element from the origin position by a gap amount between the lock mechanism and the image shake correction optical element. Such displacement from the origin position causes color shift in a captured image or the like, which deteriorates optical performance of the optical apparatus.

A similar problem to that in the lock mechanism occurs in a case where the end face forming the end of the movable range of the image shake correction optical element is shifted from a default position by changes with time due to abrasion or the like.

SUMMARY OF THE INVENTION

The present invention provides an optical apparatus capable of accurately setting an origin position in optical image shake correction control even if changes with time due to abrasion or the like occur.

The present invention provides as one aspect thereof an optical apparatus which includes an image shake correction optical element configured to be driven in a movable range including an optical origin position, a position detector configured to detect a position of the image shake correction optical element, a locking mechanism configured to mechanically limit movement of the image shake correction optical element within a lock range which includes the optical origin position and is narrower than the movable range, a memory configured to store a first distance between a first reference position in the movable range and the optical origin position and a second distance between a second reference position in the lock range and the optical origin position, and a controller configured to control a position of the image shake correction optical element based on a control origin position, the control origin position being one of a first origin position obtained from the first reference position and the first distance, and a second origin position obtained from the second reference position and the second distance. The controller performs correction of at least one of the first distance, the second distance and the control origin position based on at least one of a difference between a detection result of the position detector and the second distance when moving the image shake correction optical element from the first origin position to the second reference position, and a difference between a detection result of the position detector and the first distance when moving the image shake correction optical element from the second origin position to the first reference position.

The present invention provides as another aspect thereof an optical apparatus which is detachably attachable to an image pickup apparatus and includes an image shake correction optical element configured to be driven in a movable range including an optical origin position, a position detector configured to detect a position of the image shake correction optical element, a locking mechanism configured to mechanically limit movement of the image shake correction optical element within a lock range which includes the optical origin position and is narrower than the movable range, a memory configured to store a first distance between a first reference position in the movable range and the optical origin position and a second distance between a second reference position in the lock range and the optical origin position, and a controller configured to control a position of the image shake correction optical element based on a control origin position, the control origin position being one of a first origin position obtained from the first reference position and the first distance, and a second origin position obtained from the second reference position and the second distance. The controller performs correction of at least one of the first distance, the second distance and the control origin position based on at least one of a difference between a detection result of the position detector and the second distance when moving the image shake correction optical element from the first origin position to the second reference position, and a difference between a detection result of the position detector and the first distance when moving the image shake correction optical element from the second origin position to the first reference position. The controller restricts the correction when obtaining from a controlling part of the image pickup apparatus information showing that the image pickup apparatus is in image capturing state.

The present invention provides as still another aspect thereof an image pickup system which includes an optical apparatus and an image pickup apparatus to which the optical apparatus is detachably attachable. The optical apparatus includes an image shake correction optical element configured to be driven in a movable range including an optical origin position, a position detector configured to detect a position of the image shake correction optical element, a locking mechanism configured to mechanically limit movement of the image shake correction optical element within a lock range which includes the optical origin position and is narrower than the movable range, a memory configured to store a first distance between a first reference position in the movable range and the optical origin position and a second distance between a second reference position in the lock range and the optical origin position, and a controller configured to control a position of the image shake correction optical element based on a control origin position, the control origin position being one of a first origin position obtained from the first reference position and the first distance, and a second origin position obtained from the second reference position and the second distance. The controller performs correction of at least one of the first distance, the second distance and the control origin position based on at least one of a difference between a detection result of the position detector and the second distance when moving the image shake correction optical element from the first origin position to the second reference position, and a difference between a detection result of the position detector and the first distance when moving the image shake correction optical element from the second origin position to the first reference position.

Other aspects of the present invention will become apparent from the following description and the attached drawings.

DESCRIPTION OF THE PREFERRED EMBODIMENTS

Exemplary embodiments of the present invention will be hereinafter described with reference to the accompanying drawings.

Embodiment 1

Figure 1:
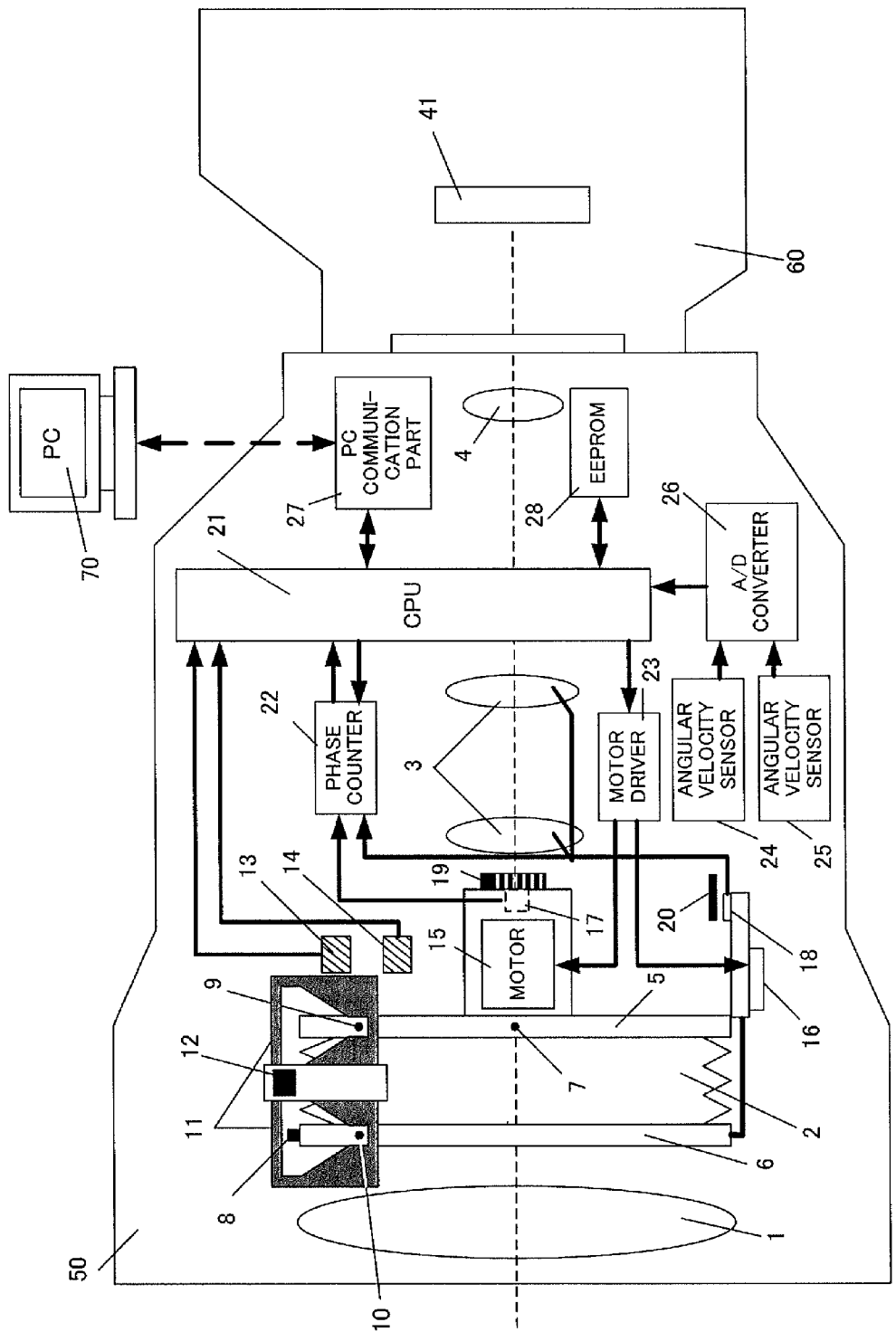
FIG. 1 is a block diagram showing a configuration of an image pickup system including a zoom lens apparatus that is Embodiment 1 of the present invention.

FIG. 1 shows a configuration of an image pickup system including a zoom lens apparatus as an optical apparatus which is a first embodiment (Embodiment 1) of the present invention. The zoom lens apparatus 50 is an interchangeable lens apparatus which is detachably attachable to a camera (image pickup apparatus) 60.

The zoom lens apparatus 50 houses therein an image pickup optical system (zoom optical system). Reference numeral 1 denotes a focus lens to perform focusing. Reference numeral 2 denotes a variable angle prism (hereinafter referred to as "VAP") as an image shake correction optical element which reduces image shake generated due to hand jiggling or the like. Reference numeral 3 denotes a magnification-varying lens to vary a focal length of the image pickup optical system. Reference numeral 4 denotes a relay lens.

Light entering the zoom lens apparatus 50 passes through the image pickup optical system constituted by the focus lens 1, the VAP 2, the magnification-varying lens 3, the relay lens 4 and an iris (aperture stop) which is not shown, and forms an optical image. The optical image is converted into an electrical signal by an image pickup element 41 such as a CCD sensor or a CMOS sensor provided in the camera 60.

Figure 2:
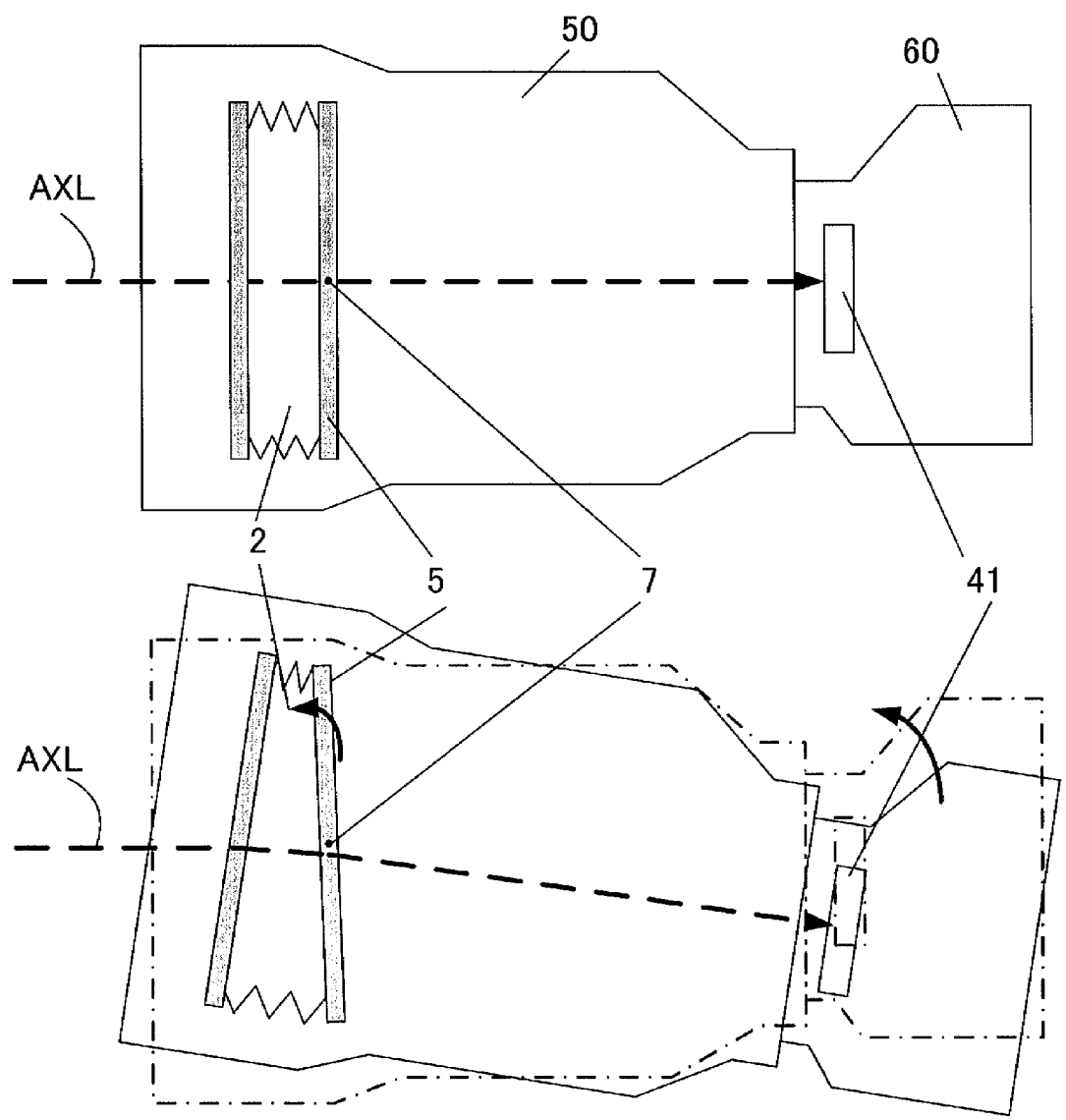
FIG. 2 shows operations of a VAP in Embodiment 1.

In the VAP 2, reference numerals 5 and 6 denote two transparent plates (hereinafter referred to as "VAP plates") which contain transparent liquid therebetween. As shown in FIG. 2, changing an angle (apex angle) formed between the VAP plates 5 and 6 by rotation (movement) of the VAP plate 5 around an axis 7 can move an optical axis AXL of the image pickup optical system in a vertical direction (tilt direction) Further, rotating (moving) the VAP plate 6 around an axis 8 can move the optical axis AXL of the image pickup optical system in a horizontal direction (pan direction). Controlling the rotational positions of the VAP plates 5 and 6 according to shake applied to the zoom lens apparatus 50 (and the camera 60) makes it possible to reduce image shake, that is, shaking of the optical image formed on the image pickup element 41.

Each of the VAP plates 5 and 6 is rotatable in a predetermined movable range. The movable range includes an optical origin position at which a light ray progressing on the optical axis AXL is allowed to straightly proceed without being refracted.

Reference numerals 9 and 10 denote stopper pins respectively provided on the VAP plates 5 and 6. Each of the stopper pins 9 and 10 is held by a lock member (lock mechanism) 11 with a certain permissible amount of movement, which mechanically limits rotation of each VAP plate (5, 6) around the axis (7, 8) within a lock range narrower than the above-described movable range.

The reason that the lock member 11 provides the certain permissible amount of movement for each of the stopper pins 9 and 10 is because manufacturing errors of the lock member 11 and the stopper pins 9 and 10 make it difficult to hold each of the VAP plates 5 and 6 accurately at the optical origin position and thus it is necessary to hold each of the VAP plates 5 and 6 at the optical origin position by positional control thereof.

Such a state where each of the stopper pins 9 and 10 is held by the lock member 11 so as to come into contact with end faces of the lock member 11 forming ends of the lock range and thereby the rotation of each of the VAP plates 5 and 6 is mechanically limited within the lock range is referred to as "locked state". Further, a state where the holding of the stopper pins 9 and 10 by the lock member 11 (that is, the rotation limitation of the VAP plates 5 and 6) is released and thereby the rotation of each of the VAP plates 5 and 6 within the movable range is allowed is referred to as "unlocked state". In this embodiment, in the unlocked state, each of the stopper pins 9 and 10 comes into contact with the end faces of the lock member 11 forming the ends of the movable range to limit the rotation of each of the VAP plates 5 and 6 within the movable range.

Reference numeral 12 denotes a lever to switch the lock member 11 between the locked state and the unlocked state. The lever 12 is operated by a user (operator).

Figure 3:
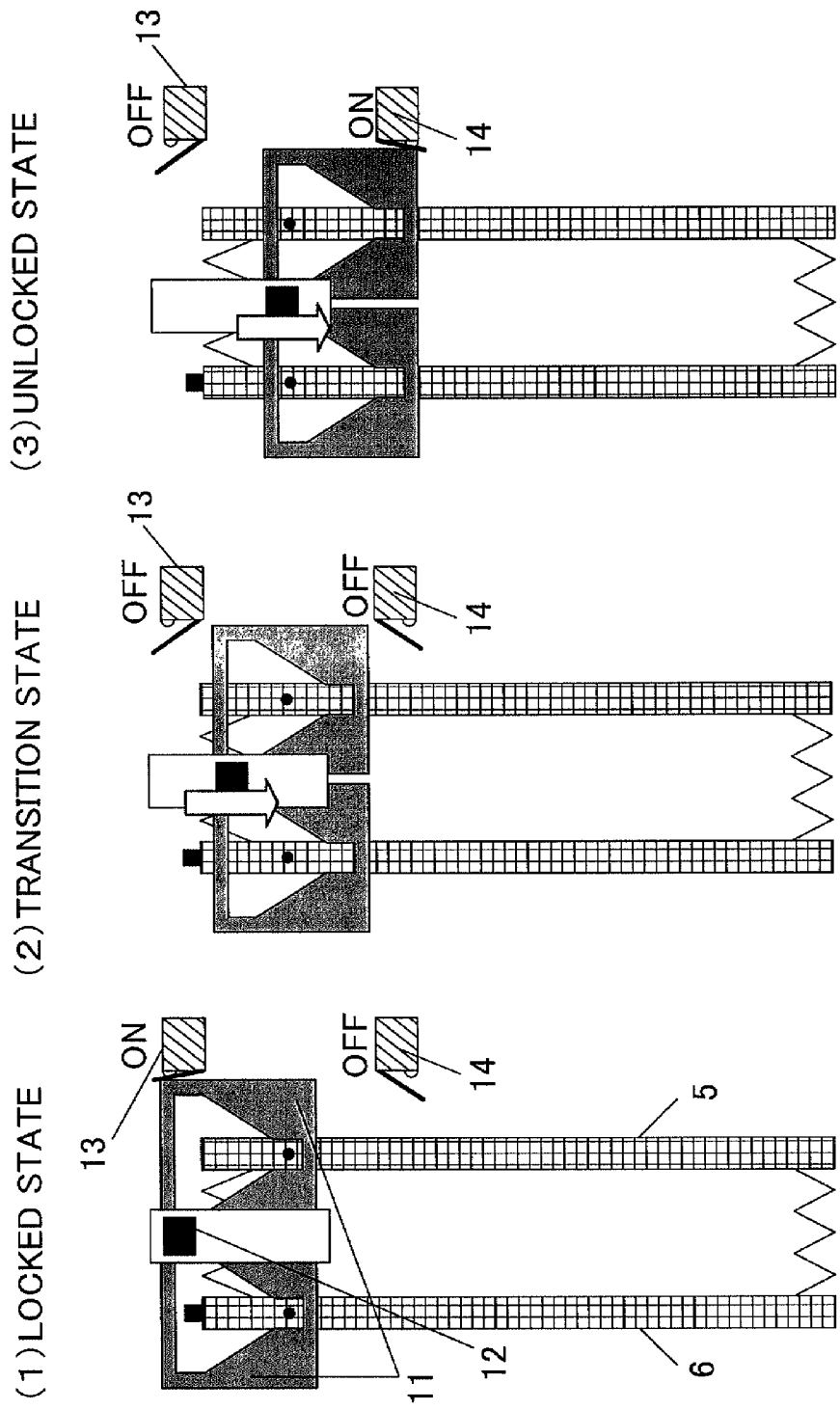
FIG. 3 shows a locked state, a transition state and an unlocked state of the VAP in Embodiment 1.

Reference numeral 13 denotes a lock detector that detects that the lock member 11 has completely been set to the locked state as shown in FIG. 3(1). Reference numeral 14 denotes an unlock detector that detects that the lock member 11 has completely been set to the unlocked state as shown in FIG. 3(3). Each of the lock detector 13 and the unlock detector 14 is turned on by movement of its switch plate pushed by the lock member 11. A state which is neither the complete locked state nor the complete unlocked state is referred to as "transition state".

In FIG. 1, reference numerals 15 and 16 denote voice coil motors (actuator) each constituted by a coil, a magnet and a yoke. Energizing the voice coil motor 15 rotates the VAP plate 5, and changing a direction of the energization of the voice coil motor 15 switches a direction of the rotation of the VAP plate 5. Energizing the voice coil motor 16 rotates the VAP plate 6, and changing a direction of the energization of the voice coil motor 16 switches a direction of the rotation of the VAP plate 6.

Reference numerals 17 and 18 denote pulse encoders which are relative position detectors that respectively detect positions (rotational positions) of the VAP plates 5 and 6. The pulse encoders 17 and 18 respectively project light fluxes onto scales 19 and 20. On each of the scales 19 and 20, a pattern is formed which converts the projected light flux into two reflected light fluxes whose intensities change with a phase difference of 90°. Each of the pulse encoders 17 and 18 receives the two reflected light fluxes to photoelectrically convert them into electrical signals (hereinafter referred to as "A-phase signal" and "B-phase signal") having a phase difference of 90°.

Reference numeral 22 denotes a phase counter that generates a positional change value (+1 or −1) of each VAP plate from the A- and B-phase signals output from each pulse encoder, and counts the positional change value to output the counted positional change value as a position count value X. The phase counter 22 separately processes the positional change values from the pulse encoders 17 and 18 to output two position count values X. The position count value X is reset to 0 at a time of power-on of the zoom lens apparatus 50 (at a time of start of power supply from the camera 60 in a case where power is supplied from the camera 60 to the zoom lens apparatus 50).

Description will be made of the A- and B-phase signals output from each of the pulse encoders 17 and 18 and the position count value X generated by the phase counter 22 that receives the A- and B-phase signals with reference to FIGS. 4 to 6. Although FIGS. 5 and 6 show only the pulse encoder 17 and the scale 19 among the pulse encoders 17 and 18 and the scales 19 and 20, the following description is also applicable to the pulse encoder 18 and the scale 20.

Figure 4:
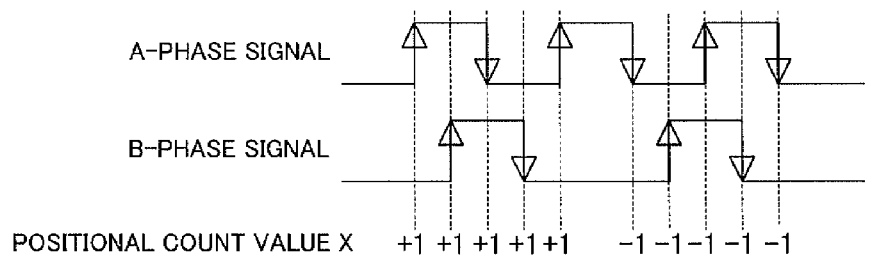
FIG. 4 is a table showing a counting method performed by a phase counter in Embodiment 1.

The phase counter 22 makes an increment (+1) and a decrement (−1) of the position count value X, as shown in FIG. 4, based on a relationship of levels ("High" and "Low") of the A- and B-phase signals and level changes thereof from "High" to "Low" or "Low" to "High".

Figure 5:
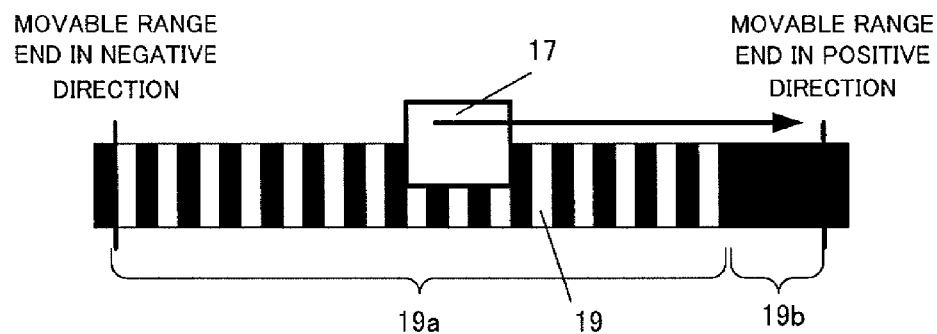
FIG. 5 shows an output signal from a position detector and a value counted by the phase counter when the VAP is driven in a positive direction in Embodiment 1.
Figure 5:
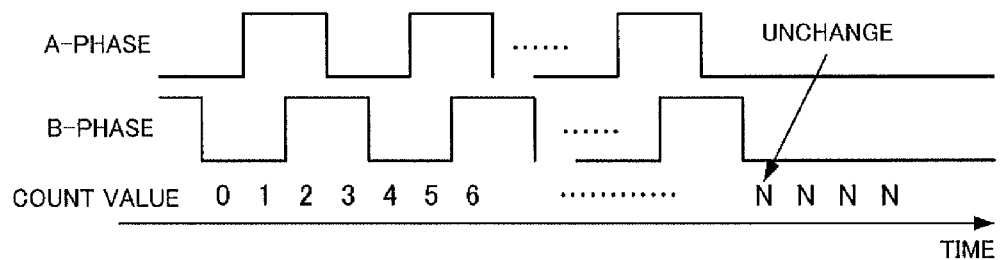
Figure 6:
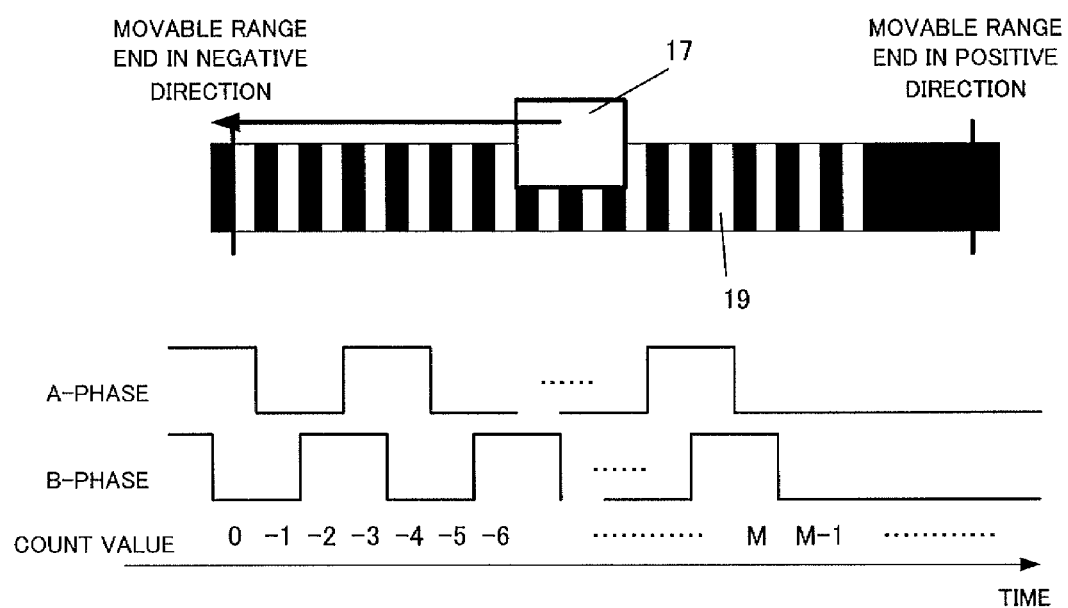
FIG. 6 show an output signal from the position detector and a value counted by the phase counter when the VAP is driven in a negative direction in Embodiment 1.

FIG. 5 shows the A- and B-phase signals and the position count value X when the pulse encoder 17 moves with respect to the scale 19 in a positive direction, and FIG. 6 shows them when the pulse encoder 17 moves with respect to the scale 19 in a negative direction. As understood from these figures, the position count value X is incremented when the pulse encoder 17 moves in the positive direction, and the position count value X is decremented when the pulse encoder 17 moves in the negative direction.

An effective pattern portion 19a in which a high reflectance area (white area in the figures) and a low reflectance area (black area in the figures) are alternately formed is formed on the scale 19. The levels of the A- and B-phase signals change between "High" and "Low" when the pulse encoder 17 facing this effective pattern portion 19a moves with respect thereto with the VAP plate 5, and thereby the position count value X is incremented or decremented.

On the other hand, an ineffective pattern portion (low reflectance area) 19b is formed near an end of the scale 19 in the positive direction. The levels of the A- and B-phase signals do not change from "Low" even when the pulse encoder 17 facing the ineffective pattern portion 19b moves with respect thereto with the VAP plate 5, and therefore the position count value X also does not change.

Returning to FIG. 1, reference numeral 21 denotes a CPU which is a controller. Reference numeral 23 denotes a motor driver which controls the energization of the coils of the voice coil motors 15 and 16 (in other words, controls drive of the voice coil motors 15 and 16) according to a control signal generated by the CPU 21.

Reference numerals 24 and 25 denote angular velocity sensors which are shake sensors that detect shaking of the zoom lens apparatus 50. Analogue signals output from the angular velocity sensors 24 and 25 are converted into digital signals by an A/D converter 26 and then input to the CPU 21. The angular velocity sensor 24 detects an angular velocity in the tilt direction, and the angular velocity sensor 25 detects an angular velocity in the pan direction.

Reference numeral 27 denotes a PC communication part which enables communication between the CPU 21 and a personal computer (PC) 70. Reference numeral 28 denotes an EEPROM which is a memory that stores various data used for controlling operations of the zoom lens apparatus 50. The PC 70 is connected to the PC communication part 27 when adjustment of the zoom lens apparatus 50 is performed.

Next, image shake correction processing performed by the CPU 21 will be described with reference to a flowchart shown in FIG. 7. The image shake correction processing is performed according to a computer program stored in the CPU 21. Although, description will hereinafter be made of only the image shake correction processing in the tilt direction, the description is also applicable to the image shake correction processing in the pan direction.

At S201 ("S" means "step"), the CPU 21 determines a current mode. The CPU 21 has a "normal mode" in which an image shake correction operation is performed and an "adjustment mode" in which origin correction value acquisition processing is performed for acquiring a correction value used to detect a control origin position described below. The mode of the CPU 21 is switched in response to a command from the PC 70 connected to the PC communication part 27. The "normal mode" is set as a default mode at the time of power-on.

If determined that the current mode is the "adjustment mode" at S201, the CPU 21 proceeds to S202 to perform the origin correction value acquisition processing, and then proceeds to S204. The origin correction value acquisition processing will be specifically described later.

If determined that the current mode is the "normal mode" at S201, the CPU 21 proceeds to S203 to perform the origin position detection processing, and then proceeds to S204. The origin position detection processing will be specifically described later.

At S204, the CPU 21 determines whether the lock member 11 is in the "locked state", the "unlocked state" or the "transition state" on the basis of the signals from the lock detector 13 and the unlock detector 14.

If the lock member 11 is in the "unlocked state", the CPU 21 proceeds to S205 to acquire angular velocity data from the angular velocity sensor 24 through the A/D converter 26. Then, at S206, the CPU 21 performs HPF processing to remove a low frequency component from the angular velocity data. Further, at S207, the CPU 21 integrates data after the HPF processing to calculate angular displacement data.

Next, at S208, the CPU 21 performs amplitude adjustment processing to convert the calculated angular displacement data into data of a target position of the VAP plate 5 for reducing (canceling) image shake corresponding to the angular displacement, and sets the data after the amplitude adjustment processing to a VAP target position.

Further, at S210, the CPU 21 acquires the position count value X from the phase counter 22. Then, at S211, the CPU 21 calculates VAP speed command data from a difference between the VAP target position set at S208 and the position count value X acquired at S210. The CPU 21 converts the VAP speed command data to a duty ratio, and outputs it to the motor driver 23 as a PWM waveform (control signal).

On the other hand, if the lock member 11 is in the "locked state" or the "transition state" at S204, the CPU 21 proceeds to S209 to set the VAP target position to the control origin position. Next, the CPU 21 proceeds to S210 to calculate the VAP speed command data from a difference between this VAP target position and the position count value X acquired at S210, and then outputs the PWM waveform (control signal) to the motor driver 23 at S211.

The control origin position means an origin position of the VAP plate 5 for control thereof, that is, for the image shake correction processing performed by the CPU 21. Controlling the rotational position of the VAP plate 5 based on the control origin position matching the above-described optical origin position makes it possible to achieve a good image shake correction effect.

Next, the origin correction value acquisition processing performed at S202 shown in FIG. 7 will be described with reference to a flowchart shown in FIG. 8. The origin correction value acquisition processing is performed to acquire a correction value used for detecting (deciding) the control origin position from the reference position in the origin position detection processing performed at S203, and to store it in the EEPROM 28. The origin correction value acquisition processing is mainly performed at a time of initial setting after manufacturing of the zoom lens apparatus 50 has been completed. In other words, the origin correction value acquisition processing is performed in a state where a change with time such as abrasion does not occur in the lock member 11 at all. In the origin correction value acquisition processing, the position of the VAP plate 5 is matched to the optical origin position through the PC 70.

At S301, the CPU 21 checks whether or not the CPU 21 has been received a command from the PC 70 through the PC communication part 27. The CPU 21 continues the checking until the CPU 21 receives any command, and proceeds to S302 if the CPU 21 has received it.

At S302, the CPU 21 determines whether the received command is an "origin position setting completion command", a "positive drive command", a "negative drive command" or other commands. If received the other commands, the CPU 21 returns to S301 to wait for reception of any command again. If received the "positive drive command", the CPU 21 proceeds to S303 to control the voice coil motor 15 through the motor driver 23 so as to minutely rotate the VAP plate 5 from a current position in the positive direction, and then returns to S301. If received the "negative drive command", the CPU 21 proceeds to S304 to control the voice coil motor 15 so as to minutely rotate the VAP plate 5 from the current position in the negative direction, and then returns to S301. These processes performed in response to the "positive drive command" and the "negative drive command" are processes for moving the VAP plate 5 to the optical origin position through the PC 70.

On the other hand, if received the "origin position setting completion command" at S302, the CPU 21 proceeds to S305. At S305, the CPU 21 resets the position count value X to 0. Then, the CPU 21 checks the state of the lock member 11 at S306. If the state of the lock member 11 is the "transition state", the CPU 21 waits until the state of the lock member 11 is changed to the "unlocked state" or the "locked state", and proceeds to S307 if the state thereof is the "unlocked state".

At S307, the CPU 21 controls the voice coil motor 15 to drive the VAP plate 5 to a position (hereinafter referred to as "movable range end") at which the stopper pin 9 comes into contact with the end face of the movable range in the positive direction, the end face being formed on the lock member 11. Then, the CPU 21 stores a current position count value X in the EEPROM 28 as an unlock origin correction value $X_U$ at S308. As described above, the position count value does not change in the area (hereinafter referred to as "non-counting area") near the movable range end of the movable range in the positive direction because the ineffective pattern portion 19b is formed on the scale 19. Therefore, the unlock origin correction value $X_U$ shows a distance (first distance) from an end position (first reference position) of the non-counting area closer to the movable range than another end position thereof to the optical origin position. Hereinafter, the end position of the non-counting area closer to the movable range than the other end position thereof is referred to as "central side end position of the non-counting area".

Next, at S309, the CPU 21 waits for a change of the state of the lock member 11 to the "locked state", and proceeds to S310 if the state thereof is changed to the "locked state". At S310, the CPU 21 controls the voice coil motor 15 to drive the VAP plate 5 to a position (corresponding to a second reference position and hereinafter referred to as "lock end") at which the VAP plate 5 comes into contact with an end face of the lock range in the positive direction, the end face being formed on the lock member 11.

Then, at S311, the CPU 21 stores the current position count value X in the EEPROM 28 as a lock origin correction value $X_L$. The lock origin correction value $X_L$ shows a distance (second distance) from the lock end in the positive direction to the optical origin position.

On the other hand, if determined that the lock member 11 is in the "locked state" at S306, the CPU 21 performs processing at S312 to S316. The processing at S312 to S316 is performed to acquire the lock original correction value $X_L$ in advance and to acquire thereafter the unlock origin correction value $X_U$. The processing at S312 to S316 is similar to that at S307 to S311.

When the processes at S311 and S316 have been completed, the CPU 21 proceeds to S317 to end the origin correction value acquisition processing.

Next, the origin position detection processing will be described with reference to a flowchart shown in FIG. 9. The origin position detection processing is performed to automatically detect (decide) the control origin position using the unlock origin correction value $X_U$ and the lock origin correction value $X_L$ stored in the EEPROM 28 in the above-described origin correction value acquisition processing.

Description will hereinafter be made of a case where multiple switching of the lock member 11 between the "locked state" and the "unlocked state" abrades the end faces of the lock member 11 forming the end of the lock range and thereby these end faces shift from their initial positions.

The abrasion of the end face forming the end of the lock range causes the control origin position of the VAP plate 5 to shift from the optical origin position even when the position of the VAP plate 5 moved from the lock end by a distance corresponding to the lock origin correction value $X_L$ in the negative direction is set to the control origin position. Therefore, this processing obtains a value corresponding to a difference between the control origin position (first origin position) acquired in the "unlocked state" and the control origin position (second origin position) acquired in the "locked state". Then, this processing also performs, using this value, correction of the lock origin correction value $X_L$ to a value adequate for the abraded lock member 11. The correction of the lock origin correction value $X_L$ results in correction of the control origin position.

At S401, the CPU 21 determines whether or not the zoom lens apparatus 50 is in a state immediately after power-on, and it proceeds to S402 only when the zoom lens apparatus 50 is in the state immediately after power-on. At S402, the CPU 21 initializes an unlock origin position detection completion flag Flag1 and a lock origin position detection completion flag Flag2 to OFF.

Next, at S403, the CPU 21 checks whether or not both the unlock origin position detection completion flag Flag1 and the lock origin position detection completion flag Flag2 are OFF. The CPU 21 proceeds to S404 only when both the flags Flag1 and Flag2 are OFF. At S404, the CPU 21 checks the state of the lock member 11, and it ends the processing when the state of the lock member 11 is the "transition state".

If the state of the lock member 11 is the "unlocked state" at S404, the CPU 21 proceeds to S405 to control the voice coil motor 15 to drive the VAP plate 5 to the movable range end (end of the movable range) in the positive direction. Then, the CPU 21 sets at S406 the unlock origin correction value $X_U$ read from the EEPROM 28 to the position count value X. This process decides an absolute value of the position count value X, and also decides the control origin position (first origin position).

At S407, the CPU 21 sets the unlock origin position detection completion flag Flag1 to ON since the origin position detection in the unlocked state has been completed, and then ends this processing.

On the other hand, the CPU 21 proceeds to S408 if the state of the lock member 11 is the "locked state" at S404. At S408, the CPU 21 controls the voice coil motor 15 to drive the VAP plate 5 to the lock end (end of the lock range) in the positive direction. Then, the CPU 21 sets at S409 the lock origin correction value $X_L$ read from the EEPROM 28 to the position count value X. This process decides an absolute value of the position count value X, and also decides the control origin position (second origin position).

At S410, the CPU 21 sets the lock origin position detection completion flag Flag2 to ON since the origin position detection in the locked state has been completed, and then ends this processing.

If at S403 at least one of the unlock origin position detection completion flag Flag1 and the lock origin position detection completion flag Flag2 is ON, that is, if the control origin position has been decided in at least one of the "unlocked state" and the "locked state", the CPU 21 proceeds to S411.

At S411 and S412, the CPU 21 checks the state of the lock member 11, the unlock origin position detection completion flag Flag1 and the lock origin position detection completion flag Flag2. If the state of the lock member 11 is the "locked state" and the lock origin position detection completion flag Flag2 is OFF, the CPU 21 proceeds to S413. If the state of the lock member 11 is the "unlocked state" and the unlock origin position detection completion flag Flag1 is OFF, the CPU 21 proceeds to S418.

At S413, the CPU 21 controls the voice coil motor 15 to drive the VAP plate 5 from the control origin position (first origin position) acquired in the "unlocked state" to the lock end (second reference position) in the positive direction.

Then, at S414, the CPU 21 acquires a current position count value X, and subtracts the lock origin correction value $X_L$ (second distance) read from the EEPROM 28 from this current position count value (that is, a positional detection result corresponding to distance) X. This subtraction result is defined as a difference value (shift amount) $\Delta X_L$.

The position count value X is based on the control origin position acquired in the "unlocked state". The difference value $\Delta X_L$ acquired at S414 corresponds to a shift amount between the control origin position (second origin position) acquired in the "locked state" and the control origin position (first origin position) acquired in the "unlocked state".

At S415, the CPU 21 checks whether or not the absolute value of the difference value $\Delta X_L$ is larger than a predetermined difference threshold $X_T$. The CPU 21 proceeds to S416 if the absolute value of the difference value $\Delta X_L$ is larger than the predetermined difference threshold $X_T$, and it jumps to S417 if the absolute value of the difference value $\Delta X_L$ is equal to or smaller than the predetermined difference threshold $X_T$.

At S416, the CPU 21 stores a value (corrected lock origin correction value) obtained by adding the difference value $\Delta X_L$ to the lock origin correction value $X_L$ to the EEPROM 28 as a new lock origin correction value $X_L$. That is, the CPU 21 updates the lock origin correction value $X_L$.

At S417, the CPU 21 sets the lock origin position detection completion flag Flag2 to ON, and then ends this processing.

The processing at S413 to S416 is performed to update the lock origin correction value $X_L$ on the basis of the control origin position with high reliability obtained in the "unlocked state".

This embodiment described the case where the lock origin correction value $X_L$ is updated only when the difference value $\Delta X_L$ is larger than the predetermined difference threshold $X_T$ at S415. This is because it is unnecessary to update the lock origin correction value $X_L$ in a case where the shift amount of the lock origin correction value $X_L$ is optically allowable. However, the lock origin correction value $X_L$ may be updated in any case without performing the process at S415. This is also applicable to S420 described later.

Such updating of the lock origin correction value $X_L$ stored in the EEPROM 28 matches the control origin position acquired in the "locked state" to the optical origin position, which makes it possible to control the position of the VAP plate 5 to the optical origin position in the "locked state".

On the other hand, the CPU 21 proceeding from S412 to S418 controls the voice coil motor 15 to drive the VAP plate 5 from the control origin position (second origin position) acquired in the "locked state" to the movable range end in the positive direction in the "unlocked state". This causes the VAP plate 5 to move exceeding the central side end position (first reference position) of the non-counting area.

Next, at S419, the CPU 21 acquires the current position count value X and subtracts the unlock origin correction value $X_U$ (first distance) read from the EEPROM 28 from this current position count value (positional detection result corresponding to distance) X. This subtraction result is defined as a difference value (shift amount) $\Delta X_L$.

The position count value X is based on the control origin position acquired in the "locked state". Therefore, the difference value $\Delta X_L$ acquired at S419 also corresponds to the shift amount between the control origin position (second origin position) acquired in the "locked state" and the control origin position (first origin position) acquired in the "unlocked state", as with the difference value $\Delta X_L$ acquired at S414.

At S420, the CPU 21 checks whether or not the absolute value of the difference value $\Delta X_L$ is larger than the difference threshold $X_T$ as with the process at S415. The CPU 21 proceeds to S421 if the absolute value of the difference value $\Delta X_L$ is larger than the difference threshold $X_T$, and jumps to S422 if the absolute value of the difference value $\Delta X_L$ is equal to or smaller than the difference threshold $X_T$.

At S421, the CPU 21 stores a value (corrected lock origin correction value) obtained by adding the difference value $\Delta X_L$ to the lock origin correction value $X_L$ to the EEPROM 28 as a new lock origin correction value $X_L$, as with the process at S416. That is, the CPU 21 updates the lock origin correction value $X_L$.

At S422, in order to use the control origin position with high reliability acquired in the "unlocked state" as a reference of the position count value X, the CPU 21 sets a current position count value X to the unlock origin correction value $X_U$ in a state where the VAP plate 5 is located at the movable range end. At S423, the CPU 21 sets the unlock origin position detection completion flag Flag1 to ON, and then ends this processing.

Such updating of the lock origin correction value $X_L$ stored in the EEPROM 28 matches the control origin position acquired in the "locked state" to the optical origin position, which makes it possible to control the position of the VAP plate 5 to the optical origin position in the "locked state".

FIGS. 10 and 11 show relationships of actual operations of the VAP plate 5 in the above-described origin position detection processing and the values $X_L$, $X_U$ and $\Delta X_L$. FIG. 10 shows the relationship thereof in a case where the state of the lock member 11 is changed from the "unlocked state" to the "locked state", and FIG. 11 shows that in a case where the state of the lock member 11 is changed from the "locked state" to the "unlocked state".

Figure 10A:
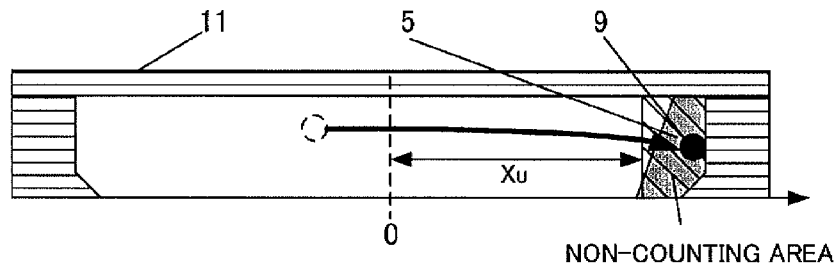
FIGS. 10A and 10B show correction value update processing performed when the VAP is changed from the unlocked state to the locked state in Embodiment 1.

When the state of the lock member 11 at the time of power-on is the "unlocked state", the VAP plate 5 is driven as shown in FIG. 10A to the movable range end (position exceeding the central side end position of the non-counting area) in the positive direction by the voice coil motor 15. At this point, the control origin position (first origin position) with respect to the central side end position of the non-counting area can be decided using the unlock origin correction value $X_U$ read from the EEPROM 28. This control origin position matches the optical origin position.

Figure 10B:
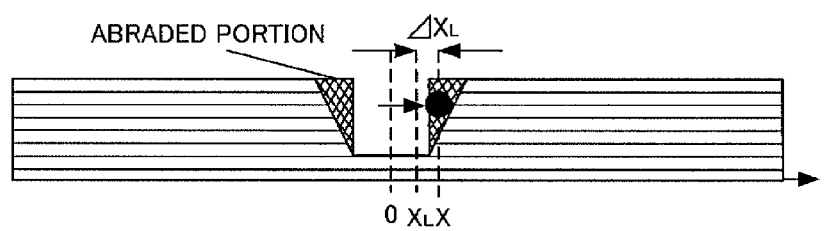

Then, when the state of the lock member 11 is changed to the "locked state", the VAP plate 5 is driven as shown in FIG. 10B to the lock end in the positive direction from the control origin position decided in the "unlocked state" by the voice coil motor 15. When the end face of the lock member 11 that decides the lock end is abraded as shown as a shaded region in FIG. 10B, the position count value X increases to a value larger than the lock origin correction value $X_L$. This indicates that it is necessary to correct the lock origin correction value $X_L$.

Therefore, the shift amount ($\Delta X_L = X - X_L$) between the position count value X and the lock origin correction value $X_L$ is added to the lock origin correction value $X_L$ to update the lock origin correction value $X_L$ stored in the EEPROM 28 to an accurate value which is based on the control origin position in the "unlocked state".

This enables accurate control of the VAP plate 5 to the optical origin position in the "locked state" even when the lock member 11 is abraded and thereby the position of the lock end which is the reference for acquiring the control origin position in the "locked state" is shifted.

Figure 11A:
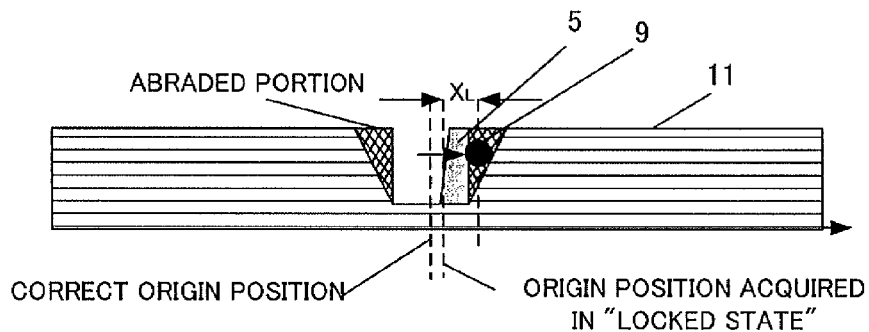
FIGS. 11A and 11B show correction value update processing performed when the VAP is changed from the locked state to the unlocked state in Embodiment 1.

When the state of the lock member 11 at the time of power-on is the "locked state", the VAP plate 5 is driven as shown in FIG. 11A to the lock end in the positive direction by the voice coil motor 15. At this point, the control origin position (second origin position) can be decided using the lock origin correction value $X_L$ read from the EEPROM 28.

In this case, when the lock member 11 is abraded, the control origin position is also shifted. However, continual updating of the lock origin correction value $X_L$ by the origin position detection processing reduces the shift amount.

Figure 11B:
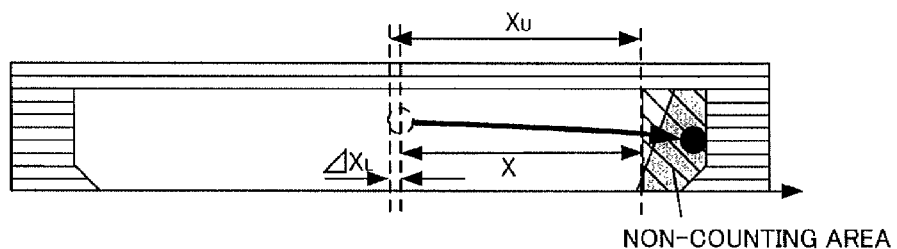

Then, when the state of the lock member 11 is changed to the "unlocked state", the VAP plate 5 is driven as shown in FIG. 11B to the movable range end in the positive direction from the control origin position decided in the "locked state" by the voice coil motor 15. If the control origin position acquired in the "locked state" is shifted, the position count value X reduces to a value smaller than the unlock origin correction value $X_U$ read from the EEPROM 28. In other words, the difference value ($\Delta X_L = X - X_U$) between the position count value X and the unlock origin correction value $X_U$ corresponds to the shift amount of the control origin position acquired in the "locked state". Therefore, the difference value $\Delta X_L$ is added to the lock origin correction value $X_L$ to update the lock origin correction value $X_L$ stored in the EEPROM 28 to an accurate value which is based on the control origin position in the "unlocked state".

This enables accurate control of the VAP plate 5 to the optical origin position in the "locked state" even when the lock member 11 is abraded and thereby the position of the lock end which is the reference for acquiring the control origin position in the "locked state" is shifted.

This embodiment used as the reference position the end position of the effective pattern portion 19*a* of the scale 19 (central side end position of the non-counting area) when acquiring the control origin position in the "unlocked state", the end of the effective pattern portion 19*a* being an end position detectable by a position detector. However, the reference position may be a position at which a contact to a mechanical end face is made.

Moreover, this embodiment defined the drive direction of the VAP plate 5 (the setting direction of the reference position) for acquiring the origin correction values $X_L$ and $X_U$ and the control origin position as the positive direction. However, the drive direction of the VAP plate 5 may be the negative direction.

Embodiment 2

Figure 12:
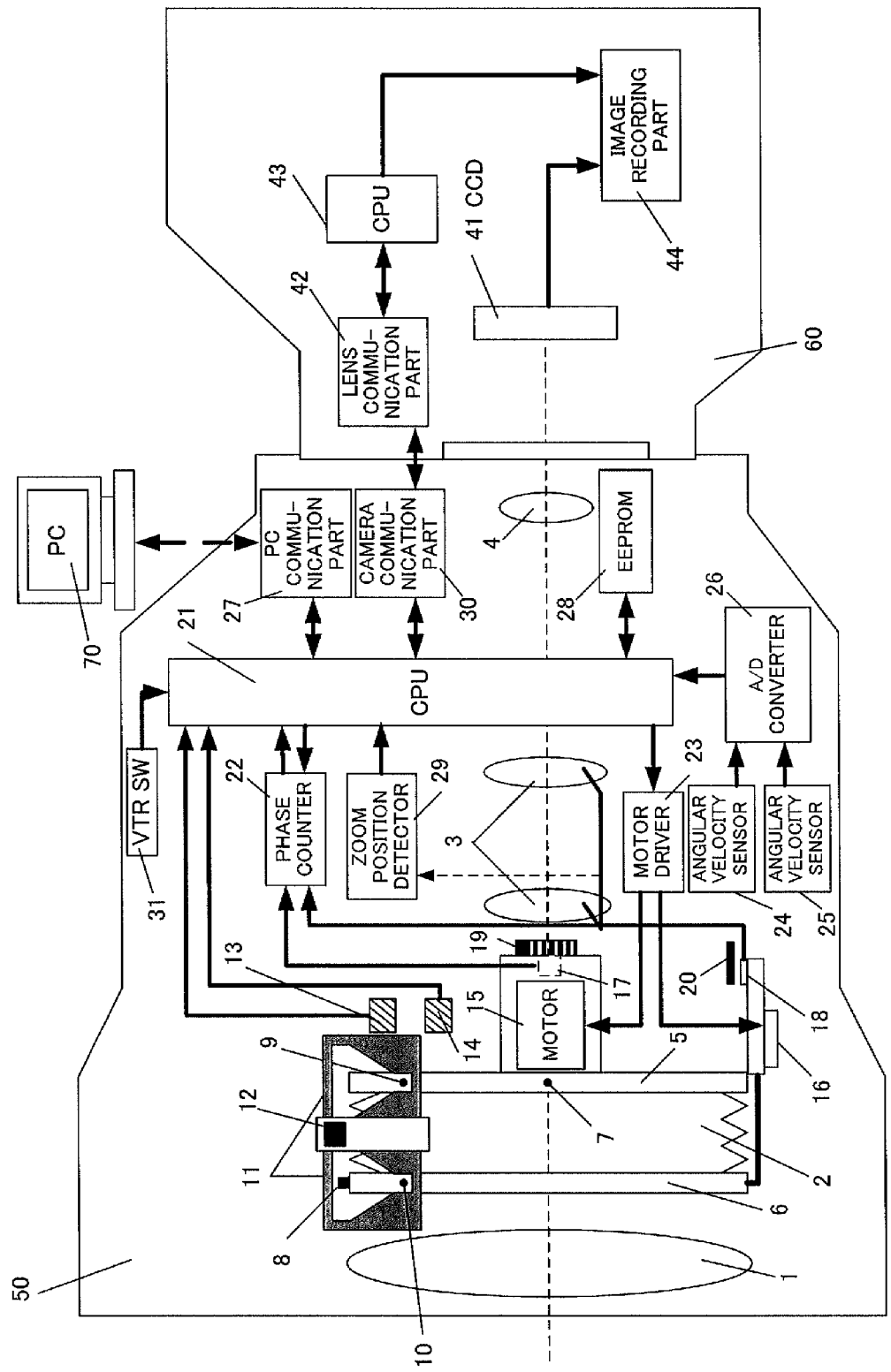
FIG. 12 is a block diagram showing a configuration of an image pickup system including a zoom lens apparatus that is Embodiment 2 of the present invention.

FIG. 12 shows a configuration of an image pickup system including a zoom lens apparatus as an optical apparatus that is a second embodiment (Embodiment 2) of the present invention. This embodiment performs the update processing of the lock origin correction value $X_L$ described in Embodiment 1 only under a specific situation so as not to give uncomfortable feeling to a user.

In FIG. 12, components identical to those shown in FIG. 1 are denoted by the same reference numerals as those in FIG. 1, and descriptions thereof are omitted.

Reference numeral 29 denotes a zoom position detector that detects a position of the magnification-varying lens 3. Reference numeral 30 denotes a camera communication part provided in the zoom lens apparatus 50 for performing communication with the camera 60. The camera communication part 30 allows communication between the CPU 21 provided in the zoom lens apparatus 50 and a camera CPU 43 provided in the camera 60 through a lens communication part 42 provided in the camera 60.

Reference numeral 31 denotes a VTR switch to switch whether or not to cause the camera 60 to capture (record) images. A signal from the VTR switch 31 is input to the CPU 21 in the zoom lens apparatus 50 and then transmitted to the camera CPU 43 through the communication. The camera CPU 43 activates and disables an image recording part 44 that records the captured images to a recording medium in response to the signal from the VTR switch 31. The captured images can be output to an outside in response to an operation of the VTR switch 31.

Figure 7:
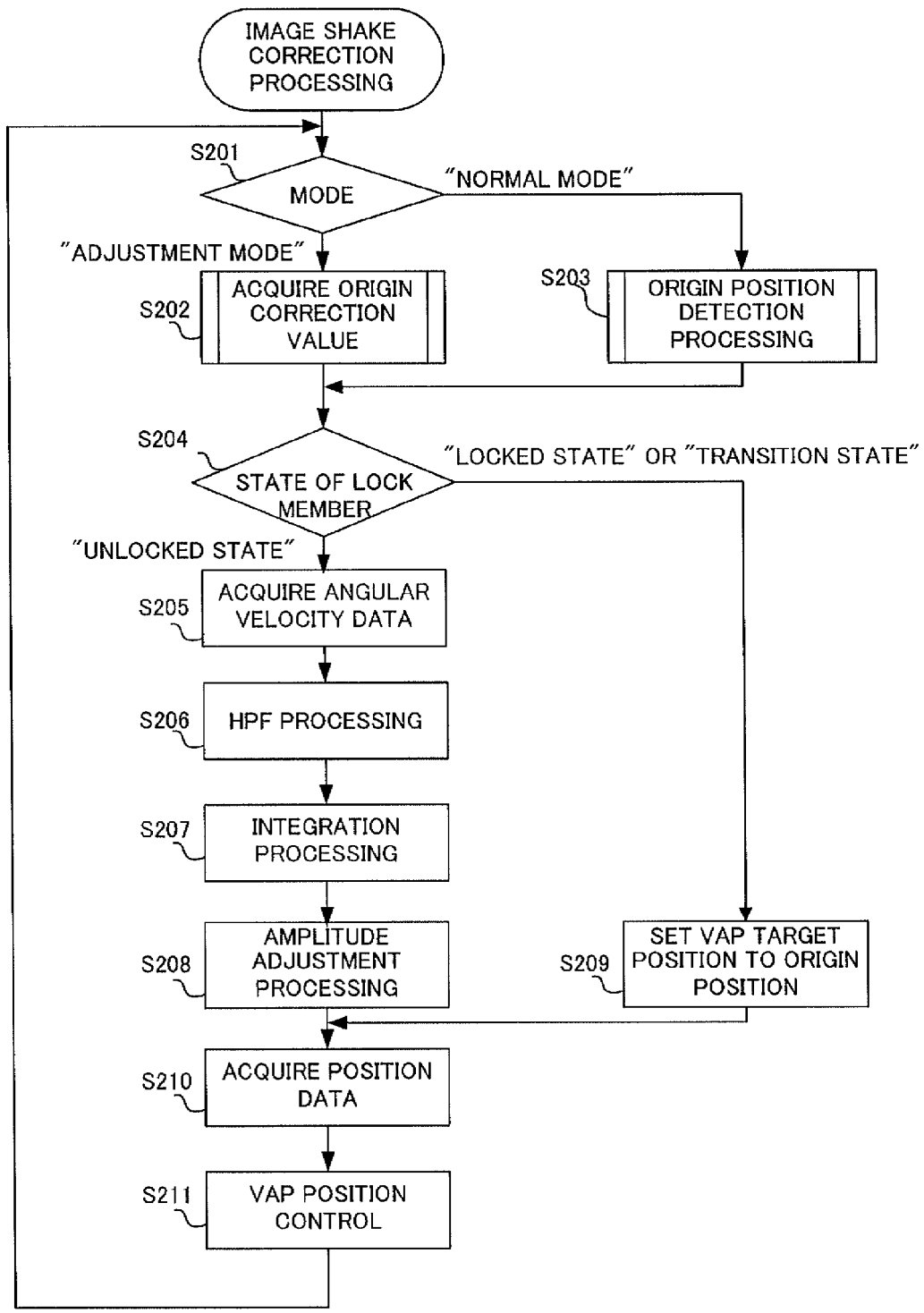
FIG. 7 is a flowchart showing image shake correction processing in Embodiment 1.
Figure 8:
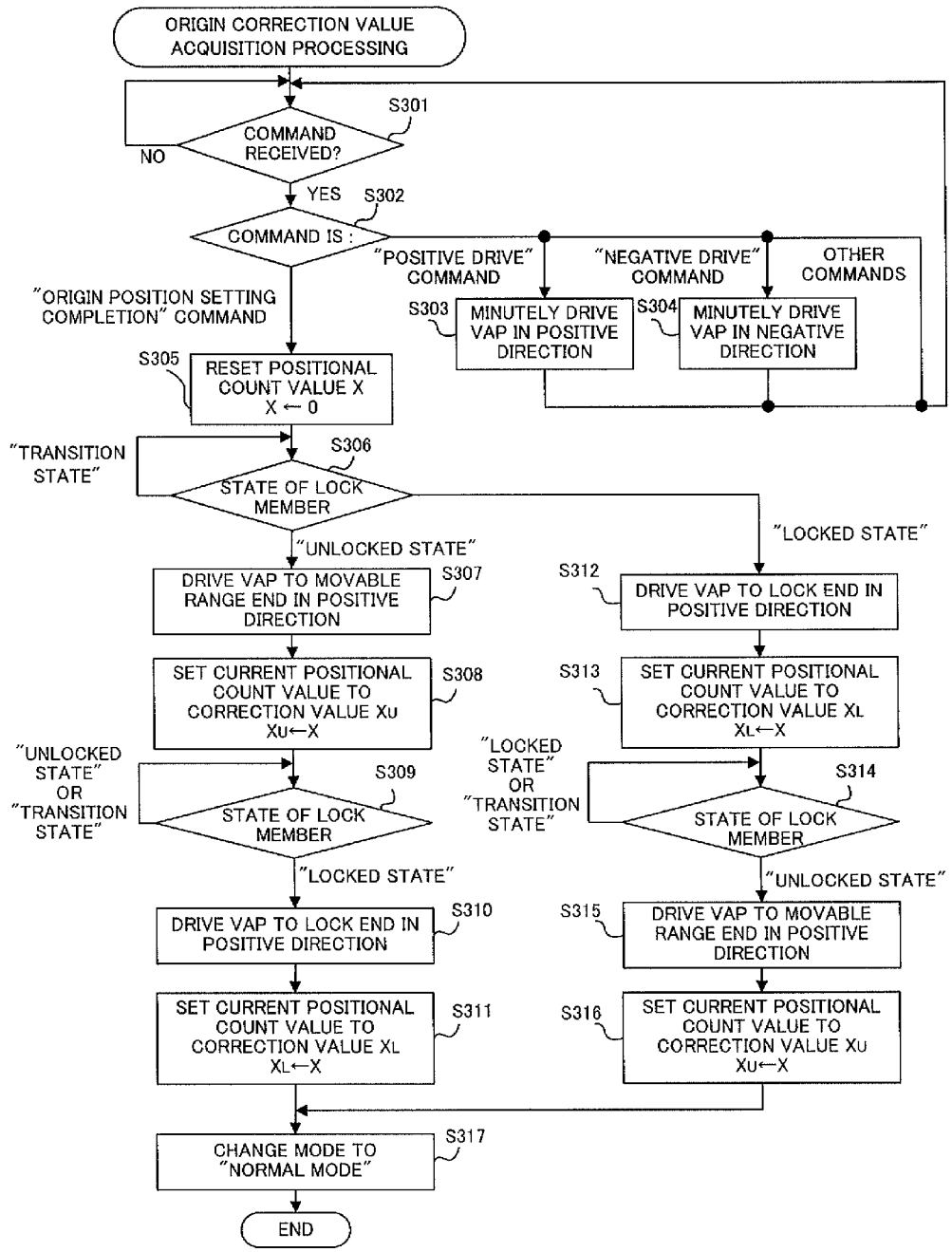
FIG. 8 is a flowchart showing origin correction value acquisition processing in Embodiment 1.

In this embodiment, the CPU 21 performs the image shake correction processing described using FIG. 7 in Embodiment 1. Moreover, the CPU 21 performs the origin correction value acquisition processing shown in FIG. 8 in Embodiment 1.

Figure 13:
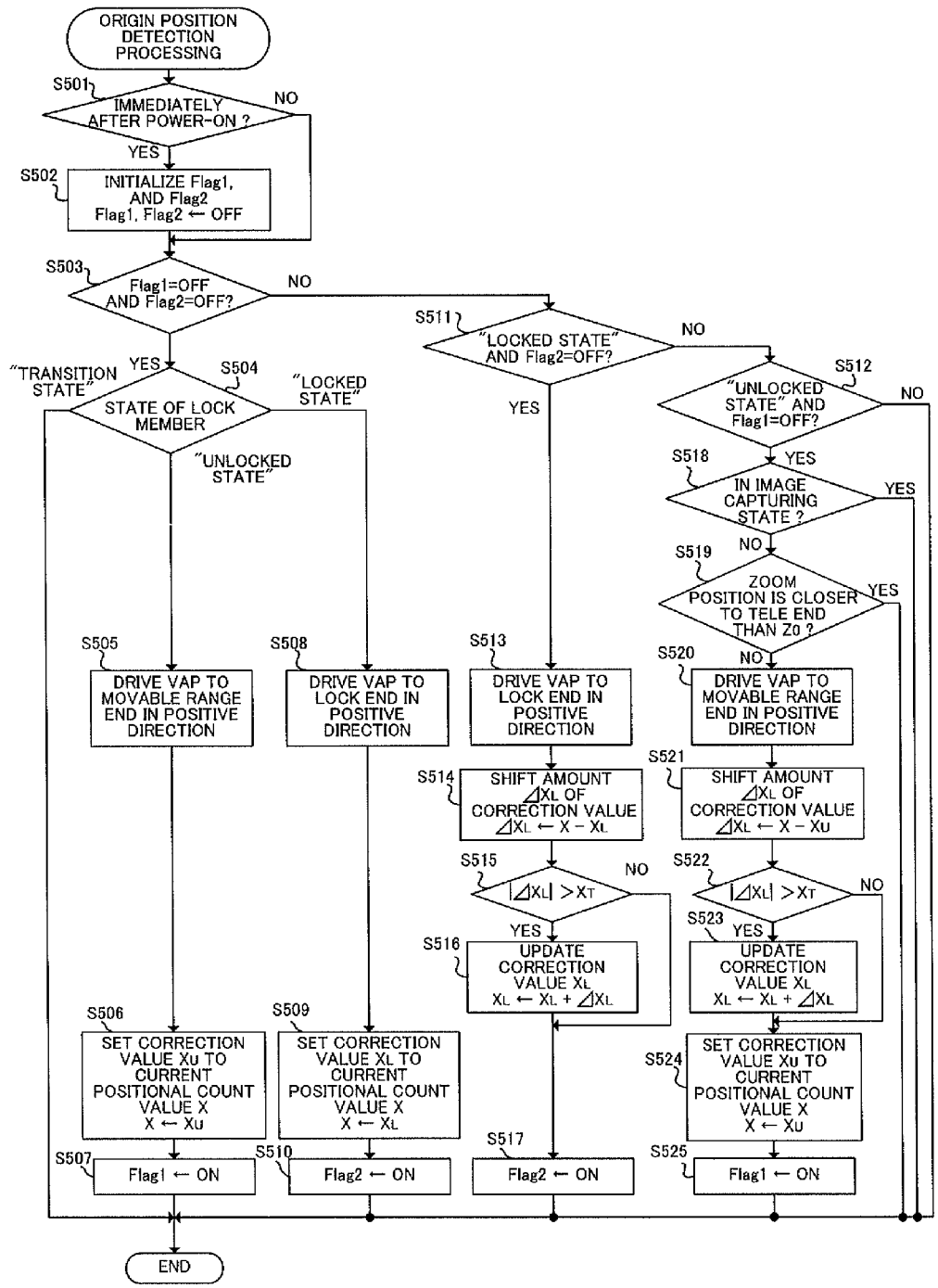
FIG. 13 is a flowchart showing origin position detection processing in Embodiment 2.

Next, description will be made of origin position detection processing performed by the CPU 21 in this embodiment with reference to a flowchart shown in FIG. 13.

At S501, the CPU 21 determines whether or not the zoom lens apparatus 50 is in a state immediately after power-on, and it proceeds to S502 only when the zoom lens apparatus 50 is in the state immediately after power-on. At S502, the CPU 21 initializes an unlock origin position detection completion flag Flag1 and a lock origin position detection completion flag Flag2 to OFF.

Next, at S503 the CPU 21 checks whether or not both the unlock origin position detection completion flag Flag1 and the lock origin position detection completion flag Flag2 are OFF. The CPU 21 proceeds to S504 only when both the flags Flag1 and Flag2 are OFF.

Figure 9:
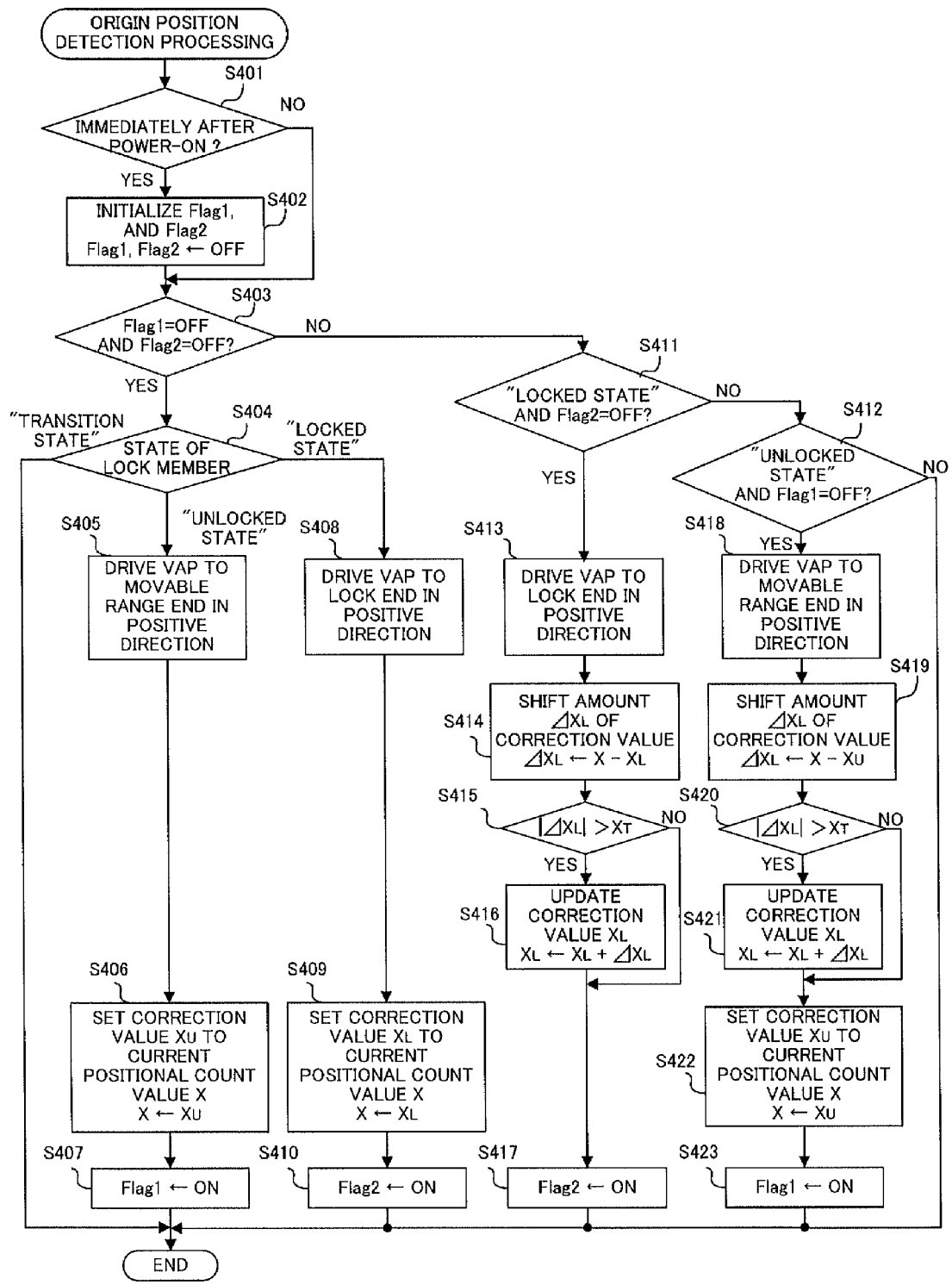
FIG. 9 is a flowchart showing origin position detection processing in Embodiment 1.

Processes at S504 to S510 are similar to those at S404 to S410 in the flowchart shown in FIG. 9 in Embodiment 1. That is, the CPU 21 determines the state of the lock member 11 and decides the control origin position according to the state thereof.

If at least one of the unlock origin position detection completion flag Flag1 and the lock origin position detection completion flag Flag2 is ON at S503, that is, if the control origin position has been decided in at least one of the "unlocked state" and the "locked state", the CPU 21 proceeds to S511.

At S511 and S512, the CPU 21 checks the state of the lock member 11, the unlock origin position detection completion flag Flag1 and the lock origin position detection completion flag Flag2. If the state of the lock member 11 is the "locked state" and the lock origin position detection completion flag Flag2 is OFF, the CPU 21 proceeds to S513. Processes at S513 to S517 are similar to those at S413 to S417 in the flowchart of FIG. 9, which perform the update processing of the lock origin correction value $X_L$.

On the other hand, if the state of the lock member 11 is the "unlocked state" and the unlock origin position detection completion flag Flag1 is OFF at S511 and S512, the CPU 21 proceeds to S518.

At S518, the CPU 21 acquires a state of the camera 60. The state of the camera 60 means whether or not the camera 60 is in an image capturing state (or in an image recording state or in an image outputting state). Since the camera CPU 43 manages the state of the camera 60, the CPU 21 acquires information on the state of the camera 60 from the camera CPU 43 through the camera communication part 30 and the lens communication part 42. If determined that the camera 60 is in the image capturing state, the CPU 21 does not perform the update processing of the lock origin correction value $X_L$ and ends this processing. The CPU 21 proceeds to S519 if the camera 60 is not in the image capturing state.

At S519, the CPU 21 determines whether or not the zoom position detected by the zoom position detector 29 is closer to a telephoto (TELE) end than a predetermined zoom threshold $Z_0$ (that is, within a predetermined range). If the zoom position is closer to the TELE end than the zoom threshold $Z_0$, the CPU 21 does not perform the update processing of the lock origin correction value $X_L$ and ends this processing. If the zoom position is not closer to the TELE end than the zoom threshold $Z_0$, the CPU 21 performs processes at S520 to S525. The processes at S520 to S525 are similar to those at S418 to S423 in the flowchart of FIG. 9, which perform the update processing of the lock origin correction value $X_L$.

Figure 14:
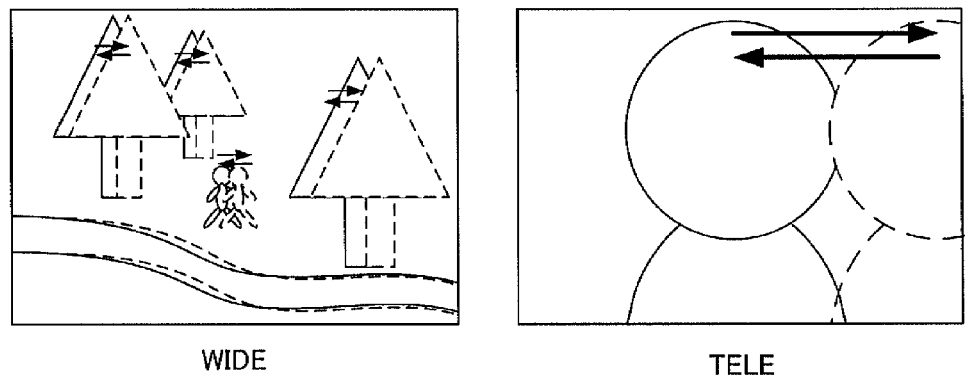
FIG. 14 shows a difference of object image movements in a WIDE side and a TELE side, the movements being caused by update processing of a correction value in Embodiment 2.

The update processing of the lock origin correction value $X_L$ in the "unlocked state" drives the VAP plate 5 to the movable range end, and thereby an object image formed on the image pickup element 41 in the update processing is widely moved, which may give uncomfortable feeling or the like to a user. Thus, this embodiment restricts the update processing of the lock origin correction value $X_L$ in the case where the camera 60 is in the image capturing state and in the case where the zoom position is close to the TELE end (see a right figure in FIG. 14) in which movement of the object image caused by the update processing is noticeable. In other words, this embodiment performs the update processing of the lock origin correction value $X_L$ only in a case where the camera 60 is not in the image capturing state and in a case where the zoom position is closer to a wide-angle (WIDE) end than the zoom threshold $Z_0$ (see a left figure in FIG. 14) in which the movement of the object image caused by the update processing is unnoticeable.

However, there are some image pickup optical systems whose configuration causes vignetting on a captured image when the VAP plate 5 is driven to the movable range end even in the case where the zoom position is close to the WIDE end. In such a case, the update processing of the lock origin correction value $X_L$ may be restricted when the zoom position is closer to the WIDE end than a predetermined zoom threshold.

This embodiment decides whether or not to perform the update processing of the lock origin correction value $X_L$ based on a condition of whether or not the camera 60 is in the image capturing state and a condition of the zoom position. However, decision of whether or not to perform the update processing of the lock origin correction value $X_L$ may be made based on only one of the above-described two conditions.

Moreover, when image capturing for image recording or external outputting of images is performed by one of plural cameras, the update processing of the lock origin correction value $X_L$ may be performed only in the zoom lens apparatus attached to a camera (or cameras) other than the image capturing camera.

Embodiment 3

FIGS. 15 and 16 show relationships of actual operations of the VAP plate 5 and the values $X_L$, $X_U$ and $\Delta X_L$ in origin position detection processing in a third embodiment (Embodiment 3) of the present invention. This embodiment uses the unlock origin position correction value $X_U$ with reference to the end face (first reference position) of the lock member 11 forming the end of the movable range in the "unlocked state". Moreover, this embodiment uses, as in Embodiment 1, the lock origin position correction value $X_L$ with reference to the end face (second reference position) of the lock member 11 forming the end of the lock range in the "locked state".

This embodiment describes a case where shifting of the lock end in the "locked state" is hardly caused due to abrasion of the end face of the lock member 11 and shifting of the movable range end in the "unlocked state" is, on the other hand, easily caused due to the abrasion of the end face of the lock member 11. In this case, it is necessary to update the unlock origin position correction value $X_U$.

FIG. 15 shows a case where the state of the lock member 11 is changed from the "unlocked state" to the "locked state", and FIG. 16 shows a case where the state of the lock member 11 is changed from the "locked state" to the "unlocked state".

Figure 15A:
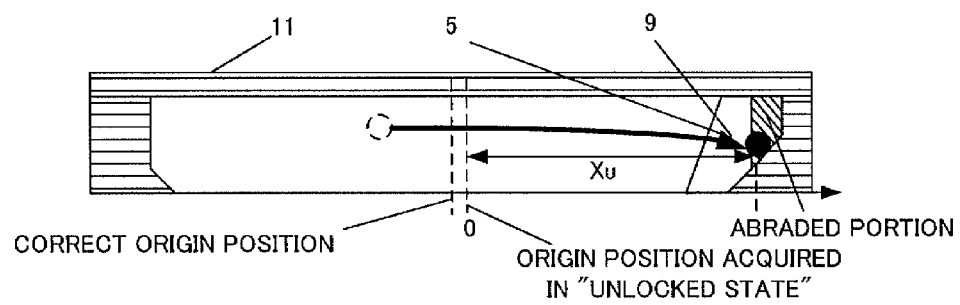
FIGS. 15A and 15B show update processing of the correction value performed when the VAP is changed from the unlocked state to the locked state in Embodiment 3 of the present invention.

When the state of the lock member 11 at the time of power-on is the "unlocked state", the VAP plate 5 is driven as shown in FIG. 15A to the movable range end in the positive direction by the voice coil motor 15. At this point, the control origin position (first origin position) in the "unlocked state" can be decided using the unlock origin correction value $X_U$ read from the EEPROM 28. In this case, when the end face of the lock member 11 forming the movable range end is abraded, the control origin position is also shifted. However, continual updating of the unlock origin correction value $X_U$ by the origin position detection processing reduces the shift amount.

Figure 15B:
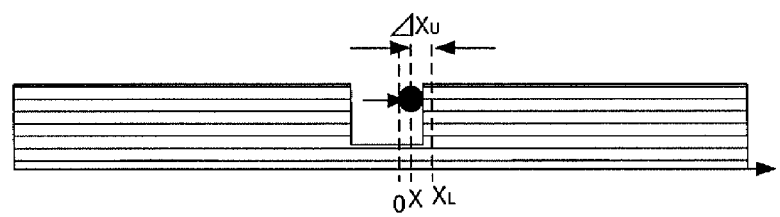

Then, when the state of the lock member 11 is changed to the "locked state", the VAP plate 5 is driven as shown in FIG. 15B to the lock end (second reference position) in the positive direction from the control origin position decided in the "unlocked state" by the voice coil motor 15. When the end face of the lock member 11 forming the movable range end in the "unlocked state" is abraded as shown as a shaded region in FIG. 15A, the position count value X reduces to a value smaller than the lock origin correction value $X_L$. This indicates that it is necessary to correct the unlock origin correction value $X_U$.

Therefore, the shift amount ($\Delta X_U = X - X_L$) between the position count value X and the lock origin correction value $X_L$ is added to the unlock origin correction value $X_U$ to update the unlock origin correction value $X_U$ stored in the EEPROM 28 to an accurate value which is based on the control origin position in the "locked state".

This enables accurate positional control of the VAP plate 5 based on the control origin position matching the optical origin position in the "unlocked state" even when the lock member 11 is abraded and thereby the position of the movable range end which is the reference for acquiring the control origin position in the "unlocked state" is shifted. For example, the VAP plate 5 can be controlled to the optical origin position, and can be controlled to be rotated from the optical origin position according to detected shaking.

Figure 16A:
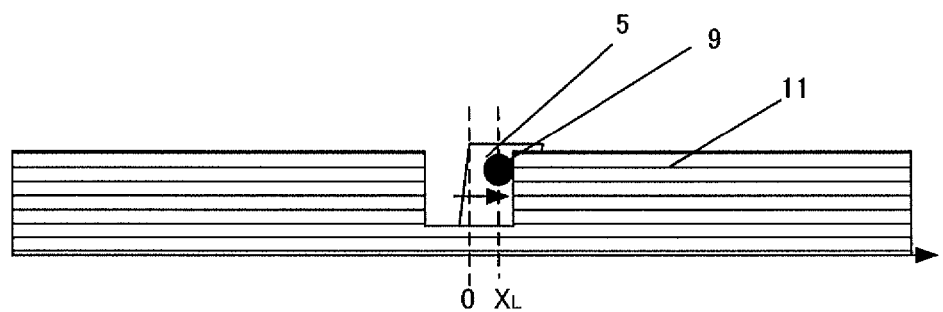
FIGS. 16A and 16B show update processing of the correction value performed when the VAP is changed from the locked state to the unlocked state in Embodiment 3.

When the state of the lock member 11 at the time of power-on is the "locked state", the VAP plate 5 is driven as shown in FIG. 16A to the lock end in the positive direction by the voice coil motor 15. At this point, the control origin position (second origin position) can be decided using the lock origin correction value $X_L$ read from the EEPROM 28. This control origin position matches the optical origin position.

Figure 16B:
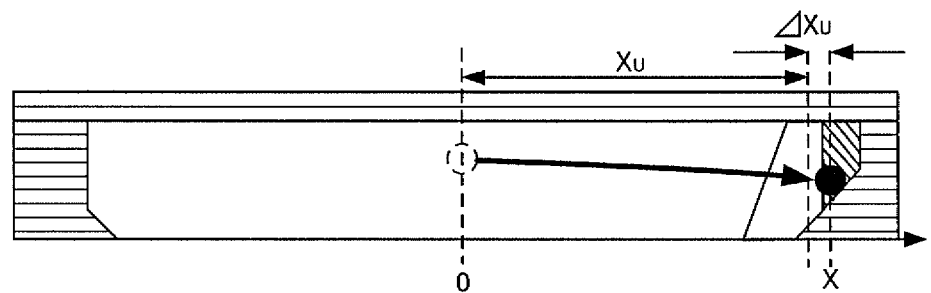

Then, when the state of the lock member 11 is changed to the "unlocked state", the VAP plate 5 is driven as shown in FIG. 16B to the movable range end in the positive direction from the control origin position decided in the "locked state" by the voice coil motor 15. When the end face of the lock member 11 forming the movable range end is abraded as shown as a shaded region in FIG. 16B, the position count value X increases to a value larger than the unlock origin correction value $X_U$. This indicates that it is necessary to correct the unlock origin correction value $X_U$.

Therefore, the shift amount ($\Delta X_U = X - X_U$) between the position count value X and the unlock origin correction value $X_U$ is added to the unlock origin correction value $X_U$ to update the unlock origin correction value $X_U$ stored in the EEPROM 28 to an accurate value which is based on the control origin position in the "locked state".

This enables accurate positional control of the VAP plate 5 based on the control origin position matching the optical origin position in the "unlocked state" even when the lock member 11 is abraded and thereby the position of the movable range end which is the reference for acquiring the control origin position in the "unlocked state" is shifted.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-171424, filed on Jun. 30, 2008, which is hereby incorporated by reference herein in its entirety.

What is claimed is:
1. An optical apparatus comprising:
an image shake correction optical element configured to be driven in a movable range including an optical origin position;

a position detector configured to detect a position of the image shake correction optical element;

a locking mechanism configured to mechanically limit movement of the image shake correction optical element within a lock range which includes the optical origin position and is narrower than the movable range;

a memory configured to store a first distance between a first reference position in the movable range and the optical origin position and a second distance between a second reference position in the lock range and the optical origin position; and a controller configured to control a position of the image shake correction optical element based on a control origin position, the control origin position being one of a first origin position obtained from the first reference position and the first distance, and a second origin position obtained from the second reference position and the second distance, wherein the controller performs correction of at least one of the first distance, the second distance and the control origin position based on at least one of a difference between a detection result of the position detector and the second distance when moving the image shake correction optical element from the first origin position to the second reference position, and a difference between a detection result of the position detector and the first distance when moving the image shake correction optical element from the second origin position to the first reference position.

2. An optical apparatus according to claim 1, wherein the second reference position is a mechanical end of the movement of the image shake correction optical element in the lock range, and wherein the controller performs the correction of the second distance.

3. An optical apparatus according to claim 1, wherein the first reference position is an end position of a detection range in which the position of the image shake correction optical element is detectable by the position detector.

4. An optical apparatus according to claim 1, wherein the first reference position is a mechanical end of the movement of the image shake correction optical element in the movable range, and wherein the controller performs the correction of the first distance.

5. An optical apparatus according to claim 1, further comprising:

a zoom optical system which includes the image shake correction optical element and whose focal length is variable; and a zoom position detector configured to detect a zoom position of the zoom optical system, wherein the controller restricts the correction when the zoom position is within a predetermined range.

6. An optical apparatus detachably attachable to an image pickup apparatus, the optical apparatus comprising:

an image shake correction optical element configured to be driven in a movable range including an optical origin position;

a position detector configured to detect a position of the image shake correction optical element;

a locking mechanism configured to mechanically limit movement of the image shake correction optical element within a lock range which includes the optical origin position and is narrower than the movable range;

a memory configured to store a first distance between a first reference position in the movable range and the optical origin position and a second distance between a second reference position in the lock range and the optical origin position; and a controller configured to control a position of the image shake correction optical element based on a control origin position, the control origin position being one of a first origin position obtained from the first reference position and the first distance, and a second origin position obtained from the second reference position and the second distance, wherein the controller performs correction of at least one of the first distance, the second distance and the control origin position based on at least one of a difference between a detection result of the position detector and the second distance when moving the image shake correction optical element from the first origin position to the second reference position, and a difference between a detection result of the position detector and the first distance when moving the image shake correction optical element from the second origin position to the first reference position, and wherein the controller restricts the correction when obtaining from a controlling part of the image pickup apparatus information showing that the image pickup apparatus is in an image capturing state.

7. An image pickup system comprising:

an optical apparatus; and an image pickup apparatus to which the optical apparatus is detachably attachable, wherein the optical apparatus comprising:

an image shake correction optical element configured to be driven in a movable range including an optical origin position;

a position detector configured to detect a position of the image shake correction optical element;

a locking mechanism configured to mechanically limit movement of the image shake correction optical element within a lock range which includes the optical origin position and is narrower than the movable range;

a memory configured to store a first distance between a first reference position in the movable range and the optical origin position and a second distance between a second reference position in the lock range and the optical origin position; and a controller configured to control a position of the image shake correction optical element based on a control origin position, the control origin position being one of a first origin position obtained from the first reference position and the first distance, and a second origin position obtained from the second reference position and the second distance, wherein the controller performs correction of at least one of the first distance, the second distance and the control origin position based on at least one of a difference between a detection result of the position detector and the second distance when moving the image shake correction optical element from the first origin position to the second reference position, and a difference between a detection result of the position detector and the first distance when moving the image shake correction optical element from the second origin position to the first reference position.

* * * * *